United States Patent [19]

Garcia et al.

[11] Patent Number: 5,071,332
[45] Date of Patent: Dec. 10, 1991

[54] SULPHUR GRANULATOR

[75] Inventors: Roberto Garcia; Jose H. da Silva, both of Belo Horizonte, Brazil

[73] Assignee: Petroleo Brasileiro S.A., Rio de Janeiro, Brazil

[21] Appl. No.: 187,768

[22] Filed: Apr. 29, 1988

Related U.S. Application Data

[62] Division of Ser. No. 97,031, Sep. 16, 1987, Pat. No. 4,944,769.

[51] Int. Cl.$^5$ .............................................. B22D 11/01
[52] U.S. Cl. ............................................ 425/6; 425/7; 425/10; 264/8; 23/293 S
[58] Field of Search ............... 425/6, 7, 10; 264/8, 264/12, 14; 23/293 S

[56] References Cited

U.S. PATENT DOCUMENTS

| | | | |
|---|---|---|---|
| 65,339 | 6/1867 | Butcher, Jr. et al. | 264/8 |
| 1,498,717 | 6/1924 | Coffin | 264/8 |
| 1,992,611 | 2/1935 | Grindrod | 425/6 |
| 2,072,263 | 3/1937 | Jones | 425/6 |
| 2,304,130 | 12/1942 | Truthe | 264/8 |
| 2,925,412 | 2/1960 | Johnston | 425/6 |
| 3,607,994 | 9/1971 | Krause et al. | 425/7 |
| 3,830,631 | 8/1974 | Young et al. | 425/7 |
| 3,907,471 | 9/1975 | Elliott | 425/6 |
| 4,218,411 | 8/1980 | Price et al. | 264/8 |
| 4,343,750 | 8/1982 | Holiday et al. | 264/8 |
| 4,347,199 | 8/1982 | Speier et al. | 264/8 |
| 4,375,440 | 3/1983 | Thompson | 264/8 |
| 4,595,350 | 6/1986 | Harbolt et al. | 425/7 |

FOREIGN PATENT DOCUMENTS

| | | |
|---|---|---|
| 8001894 | 3/1985 | Brazil. |
| 53-89866 | 8/1978 | Japan ................ 425/6 |

*Primary Examiner*—W. J. Shien
*Assistant Examiner*—R. Bruce Breneman
*Attorney, Agent, or Firm*—Sughrue, Mion, Zinn, Macpeak & Seas

[57] ABSTRACT

Sulphur is obtained to the desired granulation and at the same time cooled by means of a directed hollow cylindrical jet of melted sulfur, on either side of which, i.e., both inside and outside the cylinder of molten sulfur, there are two jets of cold water, the jets being directed onto a disk which is able to turn freely. The jets of water and sulfur strike the disk between the middle of the disk and its outer edge and make it turn, while at the same time the sulfur hardens into granules. The turning spins the granules off the disk. The fact that there are two jets of water leads to a better particle size of the sulfur and, because there is a better contact between the water and the sulfur, prevents any hardening of the sulfur upon the disk.

6 Claims, 1 Drawing Sheet

SULPHUR GRANULATOR

This is a division of application Ser. No. 07/097,031 filed Sept. 16, 1987, now U.S. Pat. No. 4,944,769.

FIELD OF THE INVENTION

The present invention relates to an improvement sulphur granulator provided with a means of conveying melted sulphur to an outlet nozzle, where two jets of water come into touch with liquid sulphur upon a rotating disk.

BACKGROUND OF THE INVENTION

Not only in the plants where sulfur is produced by synthetic processes, but also in those where it is remelted to be purified, one of the major difficulties still encountered is how to pack the sulfur. The method followed has been to lead the melted sulfur into a cooling vessel or pool (usually a long and shallow one, for obvious reasons) where it solidifies in a compact block. Such a block is then mechanically broken up, for which the simplest of hand tools, on up to percussion vibrators, are used to break the sulfur into lumps that are packed and sent off to consumers.

There are several drawbacks to this method: There must be a relatively large area for the pools; it is very difficult to break up the sulfur and lumps are not always of an even size; a great deal of labor is required (people to look after emptying in the melted sulfur and others to break it up in its solid state—even though working with semi-automatic tools only); and the risk of accidents when doing the breaking up.

To overcome such shortcomings, the applicant developed a process and granulator, as described in Brazilian Patent PI 8001894, whereby the sulfur hardened rapidly at the unloading point and its granulation was even and could be governed. The granulator consisted of an assembly of a nozzle, a disk, and a bowl.

As disclosed in PI 8001894 the nozzle had a hollow cylindrical jet of melted sulfur and within it there was a conical jet of water. Both jets hit a disk on a shaft about which the disk could turn when struck by the water and the sulfur. The tilt of the disk could be graduated. The water and the sulfur hitting the disk off-center made it spin, whereupon sulfur hardened into granules and was thrown off the disk by centrifugal force and went into a suitable bay.

However, in the first assemblies so built, the water did not strike the sulfur well enough and this led to sulfur stalagmites appearing in the bay. Also, the design of the nozzle from which the sulfur issued enabled a "cushion" of sulfur to grow upon the disk and the latter, becoming heavier, went past its optimum tilt. Such sulfur "cushions" also caused bigger lumps of sulfur to be created, standing out among the even size and finer particles in the rest of the pile. The "cushion" so created meant that the granulating chamber had to be brought to a stop.

SUMMARY OF THE INVENTION

Applicant has now developed a better granulator with a better nozzle whereby the process of squirting the water and the sulfur has been changed, the granulating process having thus been improved.

In this improved process, part of the water is turned aside into an extra jet in the middle of the hollow cylindrical jet of melted sulfur. It hits the disk which is on a shaft able to turn freely whenever struck, between the center and the periphery of such disk, features of the process being that:

(a) a jet of water is provided inside the cylinder produced by said jet of melted sulfur;
(b) another jet of water is provided surrounding said jet of sulfur;
(c) the jets of water and sulfur strike such disk;
(d) the sulfur solidifies into granules as a result of the two jets of water striking it; and
(e) said granules and the water are spun out beyond the surface of the disk, said water having been so spun out being substantially free from any solidified sulfur.

The granulator of this invention has a new nozzle with holes pointing downwards all round its circumference. It is provided with the means of letting jets of water out from below, one jet inwards of the cylinder that passes through the aforesaid circumference and the other jet outwards of such cylinder. There is also a disk on a shaft which can turn freely about such shaft, said disk lying below the holes in the nozzle. The liquid sulphur issuing from the holes does so as a jet which hits the disk between its center and its periphery. There is also a means of graduating the tilt of the disk.

DETAILED DESCRIPTION OF PREFERRED EMBODIMENTS

Figure 1:
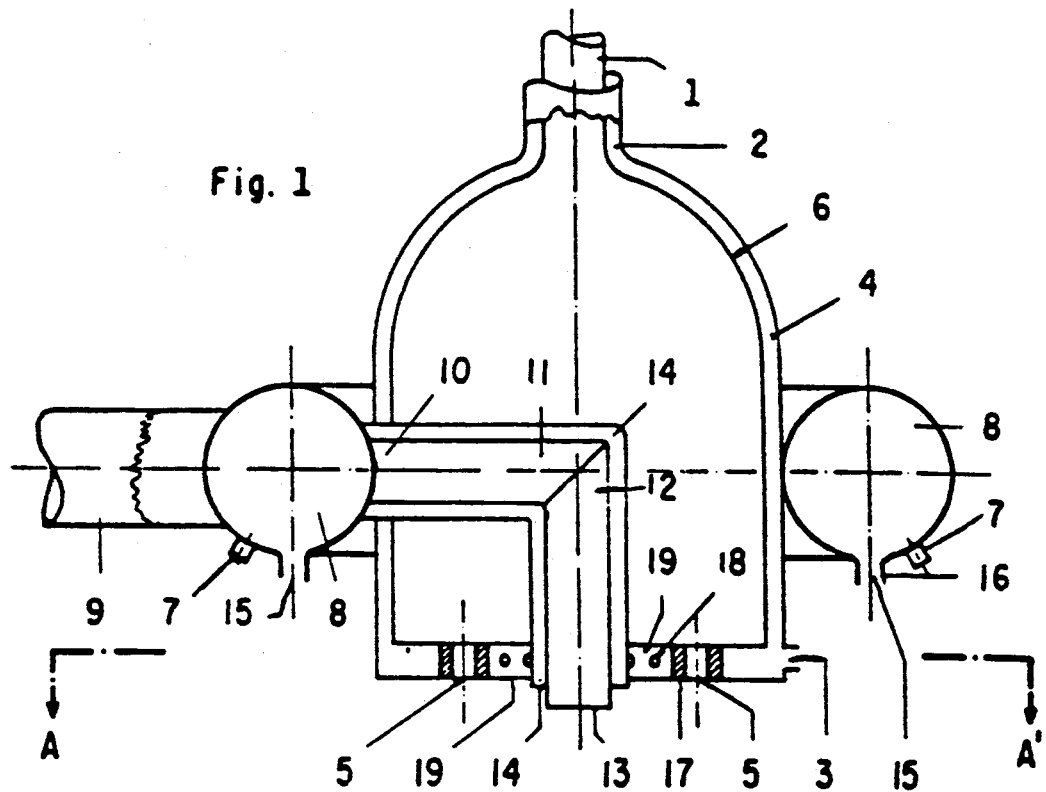
FIG. 1 is a vertical section view of the nozzle of the granulator invented.
Figure 2:
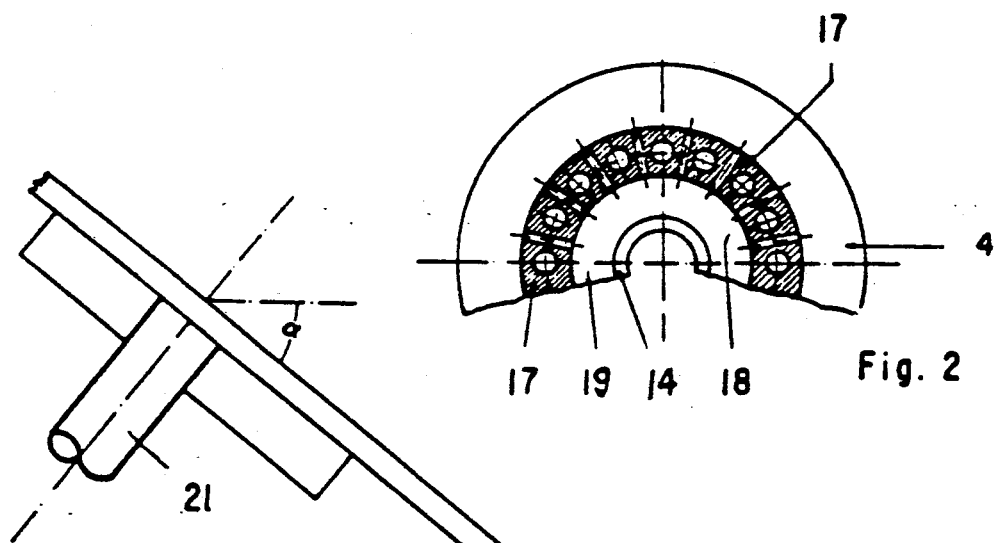
FIG. 2 is a section (AA'; of FIG. 1) of the base of the nozzle, showing holes in such base.

Pipe 1, which is part of the means for conveying the melted sulfur, connects the granulating equipment to a store of melted sulfur. Pipe 1 leads into chamber 6. Pipe 1 is surrounded by pipe 2 and chamber 6 is surrounded by liner 4 which is a continuation of pipe 2. Pipe 2 carries steam intended to keep the sulfur in a melted state until after it is ejected. Obviously liner 4 serves the same purpose. Steam comes in from inlet 3. The drain for the water condensed from the steam is not shown.

The bottom of chamber 6, which is round, has a lot of holes, 5, arranged around the circumference concentrically with the outside edge of the round bottom of such chamber 6.

The number of holes may be different, but sixteen is usual. It should be noted that the holes must go through not only the bottom of chamber 6, but also the thickness of liner 4 before the sulfur can issue forth.

For the invention, metal ring 17 is used, which goes around the bottom of the chamber, its average radius being the same as that for the circumference described by the set of holes, such holes being drilled into the aforesaid ring. Small horizontal holes, 18, are arranged radially around the ring, so as to enable space at 19 to be provided with steam. Such small holes are at right-angles to holes 5, there being one of them between every two of holes 5. This arrangement turned out to be quite sturdy, however any other which lets the sulfur run through will do.

Chamber 6 is cylindrical in shape and to its side a ring-shaped pipe 8 is fixed, which may be provided with a support 7. The cold water that comes in from inlet 9 circulates in such pipe 8.

Connected to pipe 8, in front of inlet tube 9, there is an opening 10 which feeds water to the inside jet creating means described next. Such opening 10 lies at the end of horizontal pipe 11 which continues within vertical pipe 12 up to outlet 13 leading downwards which lies in the middle of the bottom of the chamber. Pipes 11 and 12 run within a pipe which is slightly wider in diameter, which means that there is a space around them. Such space lies between two walls, one hot and the other cold, since around such space 14 there is melted sulfur flowing and inside it (within 11 and 12) there is water flowing.

Next, the means by which the water jet gets out is described. Pipe 8, already mentioned, has a slit 15 which runs all the way around the under side of the ring. The water jet comes through slit 15, concentrically with the sulfur jet, and encircling it.

Two small concentric walls 16 are welded to the edges of such slit 15, all around such edges, thus enabling the water to flow more easily and creating a suitable outside jet.

The ratio of the quantity of outside to inside jet water is usually 0.25 to 1.5.

Flanges or any other kind of usually employed device will serve to join granulator to source of supply.

Once pipes 1 and 9 have been fed with sulfur and water, this invention can be put into practice.

Figure 3:
FIG. 3 is a section of the disk as it would be tilted in relation to the nozzle in FIG. 1.

In FIG. 3, the three jets are striking disk 20 which is on a shaft 21; they strike the disk somewhere between its middle and its outside edge.

A diffuser may be placed ahead of outlet 13 so as to impart a conical shape to the inside jet of water.

The three jets will make the disk turn according to the quantity of force imparted thereto. Jets will make disk 20 turn faster or slower according to how it is tilted, and such tilt may be to either side. In FIG. 3, the angle alpha, that between the disk and the horizontal, may be either upwards or downwards. Tilt of the disk is governed by suitable means, it being the shaft that is tilted and this can be done by sliding screws, for instance. Rate of turn is also a function of the speed at which sulfur and water flow.

When the disk is turning and the jets are striking it, the water will cause the sulfur to harden evenly in small granules which will issue by centrifugal force and gather in a container not shown in Figures.

With two jets of water wetting is thorough, and also less sulfur fumes are given off, while no "cushions" at all appear on the disk nor stalagmites in the pools. Also the inside jet does not have to be conical and even so water-sulphur contact is excellent.

An important parameter used to check on the quality of the sulfur secured under this process is particle size. It is a very important point in the process, for if the sulfur hardens in big lumps it will become difficult to get it out, while on the other hand, if the droplets of sulfur are too small there will be a great deal of fines which will be dragged away by the water and large size separators will be needed to recover such sulfur out of the cooling water. The optimum particle size is arrived at by matching the diameter of holes 5 that let the sulfur into the nozzle to the pressure and rate of flow of the cooling water.

Table I shows typical particle size of output from an industrial plant:

TABLE (I)

| Screen | % Retained | Aggregate % retained |
|---|---|---|
| ¼" | 7.87 | 7.87 |
| 5 mesh Tyler | 12.79 | 20.66 |
| 8 mesh Tyler | 32.40 | 53.06 |
| 16 mesh Tyler | 30.53 | 83.59 |
| 24 mesh Tyler | 5.32 | 88.91 |
| 28 mesh Tyler | 1.59 | 90.50 |
| 42 mesh Tyler | 3.91 | 94.41 |
| 60 mesh Tyler | 1.87 | 96.28 |
| 80 mesh Tyler | 1.07 | 97.35 |
| −80 mesh Tyler | 2.65 | 100.00 |

A second important parameter concerning the quality of the sulfur is its moisture content. At first glance it would seem that since so much water is used in the process the sulfur output would be very wet, but this is not so.

The water drains rapidly away from the pile so that the moisture content of the sulfur becomes reasonable after a few hours, as is to be seen from Table II.

TABLE (II)

| Hours | Sulphur moisture content % by weight |
|---|---|
| 5 | 6.5 |
| 16 | 6.0 |
| 20 | 5.0 |
| 38 | 4.7 |
| 63 | 4.2 |

What is claimed is:

1. In a sulphur granulator provided with a means of conveying melted sulphur to an outlet nozzle, the improvement which comprises:
    the nozzle has a circumference which contains holes pointing downwards, the holes being arranged around the circumference of the nozzle and being adapted to issue a cylindrical stream of sulphur;
    a disk is provided which rests on a freely rotating shaft, the disk being provided below the holes in the circumference of the nozzle so that the cylindrical stream of sulphur issuing from the holes in the nozzle strikes the disk between the middle of the disk and the outer edge of the disk, the disk being provided with means to change the tilt of the disk; and
    means being provided for two jets of water to issue downwards to contact the cylindrical stream of sulphur issuing from the holes in the nozzle and striking the disk, one jet being on the inside of the cylindrical stream of sulphur and passing by the circumference of the nozzle and the other being on the outside of the cylindrical stream of sulphur, wherein the two jets of water come into contact with the liquid sulphur upon contacting the disk.

2. A sulphur granulator as claimed in claim 1, wherein the means for the outside jet of water consists of a ring-shaped pipe with a slit all along the underside of the ring-shaped pipe, the outside jet of water issuing from said slit along the underside of the ring-shaped pipe and surrounding the cylindrical stream of sulphur.

3. A sulphur granulator as claimed in claim 1, wherein the jet on the inside of the cylindrical stream of sulphur is formed by a means joining the means for forming the outside jet of water by a pipe which crosses means for conveying the melted sulphur.

4. A sulphur granulator as claimed in claim 3 where there is a space between the pipe and the means for conveying the melted sulphur.

5. A sulphur granulator as claimed in claim 1 wherein the means for conveying the melted sulphur and the outlet nozzle are surrounded by a liner and heated by a fluid.

6. A sulphur granulator as claimed in claim 1 wherein the rate at which the disk turns is dependent on the tilt of the disk.

* * * * *